United States Patent
Huang et al.

(10) Patent No.: US 11,290,237 B2
(45) Date of Patent: Mar. 29, 2022

(54) METHOD AND APPARATUS FOR CONFIGURING RESOURCE FOR NETWORK DEVICES SERVING OVER-THE-AIR AREAS

(71) Applicant: CLOUDMINDS ROBOTICS CO., LTD., Shanghai (CN)

(72) Inventors: William Xiao-Qing Huang, Guangdong (CN); Zhenkai Wang, Guangdong (CN); Haitao Jiang, Guangdong (CN)

(73) Assignee: CloudMinds Robotics Co., Ltd., Shanghai (CN)

( * ) Notice: Subject to any disclaimer, the term of this patent is extended or adjusted under 35 U.S.C. 154(b) by 97 days.

(21) Appl. No.: 16/555,492

(22) Filed: Aug. 29, 2019

(65) Prior Publication Data

US 2019/0394005 A1 Dec. 26, 2019

Related U.S. Application Data

(63) Continuation of application No. PCT/CN2017/103761, filed on Sep. 27, 2017.

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0695* (2013.01); *H04W 72/0406* (2013.01); *H04W 72/046* (2013.01); *H04W 72/082* (2013.01)

(58) Field of Classification Search
CPC .............. H04L 5/0051; H04W 72/082; H04W 72/046; H04W 72/0406; H04B 7/0695
See application file for complete search history.

(56) References Cited

U.S. PATENT DOCUMENTS

| 5,212,804 | A | 5/1993 | Choate |
| 8,811,213 | B1 * | 8/2014 | Rai ................... H04W 28/0226 370/252 |

(Continued)

FOREIGN PATENT DOCUMENTS

| CN | 1906804 A | 1/2007 |
| CN | 102281635 A | 12/2011 |

(Continued)

OTHER PUBLICATIONS

Extended European Search Report for European Patent Application No. 17926965.9 dated Jun. 25, 2020.

(Continued)

*Primary Examiner* — Jackie Zuniga Abad
(74) *Attorney, Agent, or Firm* — Heslin Rothenberg Farley & Mesiti, PC

(57) ABSTRACT

The present disclosure provides a method and an apparatus for configuring a resource, a network device, and a storage medium. The method includes: determining a set of network devices that corresponds to each over-the-air area and that provides a network service for the over-the-air area, where the set of network devices includes an identifier of a network device satisfying a condition for providing a network service for the over-the-air area; determining, according to the set of network devices, a target network device providing a network service for a plurality of over-the-air areas, and a beam sequence used by the target network device; generating pilot configuration information for configuring a pilot sequence for the beam sequence of the target network device; and sending the pilot configuration information to the target network device.

12 Claims, 4 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2006/0212133 A1* | 9/2006 | Damnjanovic | H04W 16/12 700/1 |
| 2010/0309876 A1* | 12/2010 | Khandekar | H04L 5/0053 370/330 |
| 2012/0200458 A1 | 8/2012 | Jalali et al. | |
| 2014/0274076 A1* | 9/2014 | Hyslop | H01Q 21/28 455/446 |
| 2016/0212669 A1* | 7/2016 | Davis | H01Q 3/2605 |

FOREIGN PATENT DOCUMENTS

| | | |
|---|---|---|
| CN | 102892128 A | 1/2013 |
| CN | 105230048 A | 1/2016 |
| CN | 105594233 A | 5/2016 |
| CN | 205545262 U | 8/2016 |
| CN | 107018514 A | 8/2017 |
| CN | 107211278 A | 9/2017 |
| JP | 2015089133 A | 5/2015 |
| JP | 2016226050 A | 12/2016 |
| JP | 2018533263 A | 11/2018 |
| WO | 2013056136 A1 | 4/2013 |
| WO | 2014110427 A1 | 7/2014 |
| WO | 2016115061 A1 | 7/2016 |
| WO | 2017040974 A1 | 3/2017 |
| WO | 2017076550 A1 | 5/2017 |
| WO | 2019056983 A1 | 3/2019 |

OTHER PUBLICATIONS

Search Report for Chinese Patent Application No. 201780002219.7 dated Apr. 15, 2021.
Search Report for Japanese Patent Application No. 2019-553243 dated Jan. 3, 2019.
International Search Report (and English translation) and Written Opinion of the International Searching Authority for International Application No. PCT/CN2017/103761 dated Jun. 12, 2018.
Partial Supplementary European Search Report for European Patent Application No. 17826965, dated Mar. 10, 2020.
Cloudminds (Shenzhen) Robotics Systems Co., Ltd., Seond Office Action with English Translation for Japanese Patent Application No. 2019-553243, dated Nov. 5, 2019, 12 pgs.

* cited by examiner

| Pilots of a beam sequence 1 of a network device 1 | Pilots of a beam sequence 2 of a network device 1 | Pilots of a beam sequence 3 of a network device 1 |

METHOD AND APPARATUS FOR CONFIGURING RESOURCE FOR NETWORK DEVICES SERVING OVER-THE-AIR AREAS

CROSS REFERENCE TO RELATED APPLICATIONS

The present disclosure is a continuation of international application No. PCT/CN2017/103761, filed on Sep. 27, 2017, and titled "METHOD AND APPARATUS FOR CONFIGURING RESOURCE, NETWORK DEVICE, AND STORAGE MEDIUM", which is incorporated herein by reference in its entirety.

TECHNICAL FIELD

The present disclosure relates to communication technologies, and in particular, to a method and an apparatus for configuring a resource, a network device, and a storage medium.

BACKGROUND

At present, production of personal and commercial unmanned aerial vehicles (UAV) is growing rapidly. The UAV is applied to people's daily life, and in addition, the UAV is further widely applied to fields such as film, media, agriculture, oil and gas monitoring. With a continuous expansion of the application field, the UAV has an increasingly high demand for communication. A network operator, a UAV manufacturer, and a supervision department are actively negotiating to pre-install a subscriber identity module (SIM) card for the UAV when being delivered, and to execute a real-name registration for starting up the UAV to achieve integration between supervision and communication. Therefore, future network-connected UAV communication based on 4G and 5G technologies will be a hot technology.

At present, a flight altitude of the UAV is up to 300 meters, and a maximum horizontal speed is up to 160 km/h. However, base stations in an existing LTE system all have a down-tilt angle and serve the ground instead of facing to the sky and serving an over-the-air area. Moreover, a propagation model between a terminal on the ground and a base station differs greatly from a propagation model between the base station and the flying UAV. Therefore, using the existing LTE system to serve the UAV will cause a lot of problems.

For example, a signal interference problem may be caused. When an existing base station serves unmanned aerial vehicles in different flying heights, there may be interference between different beams. Therefore, how to configure a network device serving an over-the-air area is an urgent problem to be solved.

SUMMARY

A main objective of the present disclosure is to provide a method and an apparatus for configuring a resource, a network device, and a storage medium, to configure a resource for a network device serving an over-the-air area, to resolve a problem of signal interference between beams.

To achieve the objective above, a first aspect of the present disclosure provides a method for configuring a resource, which includes:

determining a set of network devices that corresponds to each over-the-air area and that provides a network service for each over-the-air area, where each set of network devices includes an identifier of a network device satisfying a condition for providing a network service for the each over-the-air area;

determining, according to the each set of network devices, a target network device providing a network service for a plurality of over-the-air areas, and a beam sequence used by the target network device;

generating pilot configuration information for configuring a pilot sequence for the beam sequence of the target network device; and sending the pilot configuration information to the target network device.

In a possible implementation, the pilot configuration information is designed by combining time domain and frequency domain, so that pilots of each beam sequence of the target network device are uniformly distributed in the time domain and the frequency domain, and pilots of each of a plurality of beam sequences providing a network service for each of different over-the-air areas are staggered in the time domain and frequency domain, to avoid pilot interference between a plurality of beams providing a network service for the different over-the-air areas.

A second aspect of the present disclosure further provides an apparatus for configuring a resource, which includes:

a first determining module, which is configured to determine a set of network devices that corresponds to each over-the-air area and that provides a network service for the each over-the-air area, where each set of network devices includes an identifier of a network device satisfying a condition for providing a network service for the each over-the-air area;

a second determining module, which is configured to determine, according to the each set of network devices, a target network device providing a network service for a plurality of over-the-air areas, and a beam sequence used by the target network device;

and a generation module, which is configured to generate pilot configuration information for configuring a pilot sequence for a beam sequence of the target network device; and a sending module, which is configured to send the pilot configuration information to the target network device.

A third aspect of the present disclosure further provides a non-transitory computer readable storage medium. The non-transitory computer readable storage medium includes one or more programs for executing the method according to the first aspect.

A fourth aspect of the present disclosure further provides an apparatus for configuring a resource, includes: the non-transitory computer readable storage medium according to the third aspect, and one or more processors for executing the program in the non-transitory computer readable storage medium.

A fifth aspect of the present disclosure further provides a network device, which includes the apparatus for configuring a resource according to the second aspect or the fourth aspect, where the network device is a network management system device or a primary serving base station.

A sixth aspect of the present disclosure further provides a network device, which includes a first antenna array having an up-tilt angle, where the first antenna array is configured to send a beam sequence for providing a network service for an over-the-air area, where the network device is a base station.

The implementations provided in the above aspects of the present disclosure may further be combined to provide more implementations.

According to the technical solution above, a network device providing a network service for a plurality of over-the-air areas is determined, and pilots of a plurality of beam sequences of the network device can be configured. In this way, a respective pilot sequence can be configured for each of the plurality of beam sequences of the network device providing a network service for a respective over-the-air area, so that pilots of the beam sequences providing a network service for the different over-the-air areas are staggered in the time domain and the frequency domain, thereby avoiding pilot interference between beams, and improving network quality.

BRIEF DESCRIPTION OF THE DRAWINGS

To describe the technical solutions in embodiments of the present disclosure more clearly, the following briefly describes accompanying drawings for describing the embodiments. Obviously, the accompanying drawings in the following description show merely some embodiments of the present disclosure, and a person of ordinary skill in the art may still derive other drawings from these accompanying drawings without creative efforts.

DETAILED DESCRIPTION

To make objectives, technical solutions, and advantages of embodiments of the present disclosure more clearly, the following clearly and completely describes the technical solutions in the embodiments of the present disclosure with reference to the accompanying drawings in the embodiments of the present disclosure. Obviously, the described embodiments are some rather than all embodiments of the present disclosure. Based on the embodiments of the present disclosure, all other embodiments obtained by a person of ordinary skill in the art without creative efforts shall fall within the protection scope of the present disclosure.

The technical solutions provided in the following embodiments of the present disclosure may be applied to a wireless communication network, for example: a long term evolution (LTE for short) system, a long term evolution advanced (LTE-A for short) system, and a further evolved network, such as a 5G network.

The wireless communication network may include a base station (BS for short) and a user equipment (UE for short). The base station may be a device in communication with the user equipment or other communication stations such as a relay station. The base station may provide communication coverage for a specific physical area. For example, the base station may be specifically an evolutional node B (ENB or eNodeB for short) in LTE, or may be other access network devices providing an access service in the wireless communication network.

In general, the wireless communication network may include a network management system for performing function configuration on the base station. For a distributed wireless communication system, the base station is classified into a primary serving base station and a secondary serving base station. The primary serving base station is configured to perform function configuration on the secondary serving base station, and the secondary serving base station is configured to report related information to the primary serving base station.

In the embodiments of the present disclosure, the UE may be an unmanned aerial vehicle. In an entire wireless network, the unmanned aerial vehicle may be distributed in different over-the-air areas.

Figure 1:
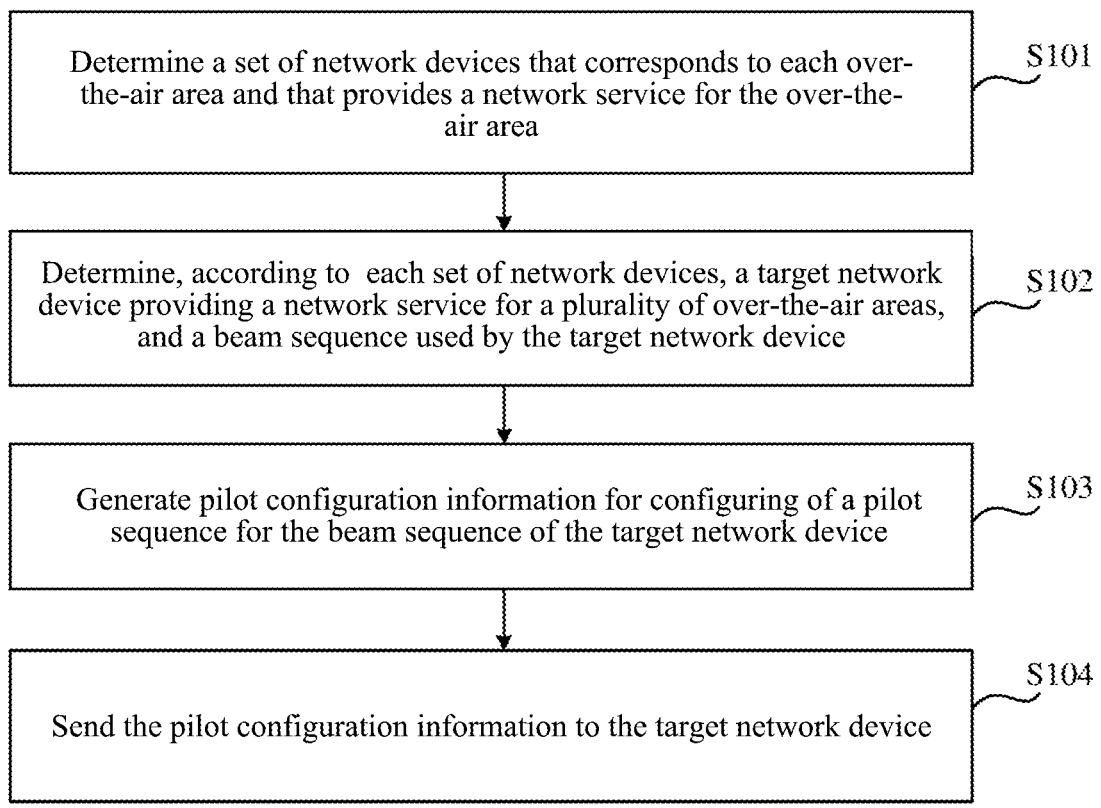
FIG. 1 is a schematic flowchart of a method for configuring a resource according to an embodiment of the present disclosure.

An embodiment of the present disclosure provides a method for configuring a resource. As shown in FIG. 1, the method includes the following steps.

At S101, a set of network devices that corresponds to each over-the-air area and that provides a network service for the each over-the-air area is determined.

The set of network devices includes an identifier of a network device satisfying a condition for providing a network service for the each over-the-air area. In a possible implementation, the set of network devices may further include an identifier of a beam sequence of each network device providing a network service for the each over-the-air area.

The over-the-air area may be an area represented by different height value ranges or different height levels. During actual implementation, the over-the-air area may be preset according to a flight capability of an unmanned aerial vehicle. For example, height levels and ranges of the height levels are preset. In this case, a height range in which the position of the terminal device falls is judged after information about a position of a terminal device flying in the air is obtained, and a height level of the terminal device is determined. Alternatively, after information about a position of a terminal device flying in the air is obtained, the over-the-air area may be divided according to a predetermined granularity. For example, the division granularity may be ten meters, which indicates that every ten meters in a vertical height may be one over-the-air area.

At S102, a target network device providing a network service for a plurality of over-the-air areas, and a beam sequence used by the target network device are determined according to the set of network devices.

That is, a network device belonging to a plurality of sets of network devices is used as the target network device. In addition, the network device may report information about all beam sequences of the network device to a network management system or a primary serving base station when being initially started, and therefore, the beam sequences used by the target network device can be determined.

At S103, pilot configuration information for configuring a pilot sequence for the beam sequence of the target network device is generated.

At S104, the pilot configuration information is sent to the target network device.

According to the method above, a network device providing a network service for a plurality of over-the-air areas is determined, and pilots of a beam sequence of the network device can be configured. In this way, a respective pilot sequence can be configured for each of the plurality of beam sequences of the network device providing a network service for a respective over-the-air area. For example, in a possible implementation of this embodiment of the present disclosure, the pilot configuration information is designed by combining time domain and frequency domain, so that pilots of each beam sequence of the target network device are uniformly distributed in the time domain and the frequency domain, and pilots of each of a plurality of beam sequences providing a network service for each of different over-the-air areas are staggered in the time domain and the frequency domain, to avoid pilot interference between a plurality of beams providing a network service for the different over-the-air areas.

For example, network devices and identifiers of beam sequences that are included in a set of network devices corresponding to an over-the-air area 1 are: a network device 1 and a beam sequence 2, a network device 2 and a beam sequence 2, and a network device 3 and a beam sequence 1; network devices and beams identifiers that are included in a set of network devices corresponding to an over-the-air area 2 are: the network device 1 and the beam sequence 1, the network device 2 and the beam sequence 1, and the network device 3 and the beam sequence 2; and network devices and identifiers of beam sequences that are included in a set of network devices corresponding to an over-the-air area 3 are: the network device 1 and a beam sequence 3, the network device 3 and a beam sequence 3, and a network device 4 and the beam sequence 1.

In this case, because the network device 1 serves the over-the-air area 1, the over-the-air area 2, and the over-the-air area 3, the network device 2 serves the over-the-air area 1 and the over-the-air area 2, and the network device 3 serves the over-the-air area 2 and the over-the-air area 3, the network device 1, the network device 2, and the network device 3 can be determined as target network devices, and pilot sequences can be configured for the target network devices.

Figure 2:
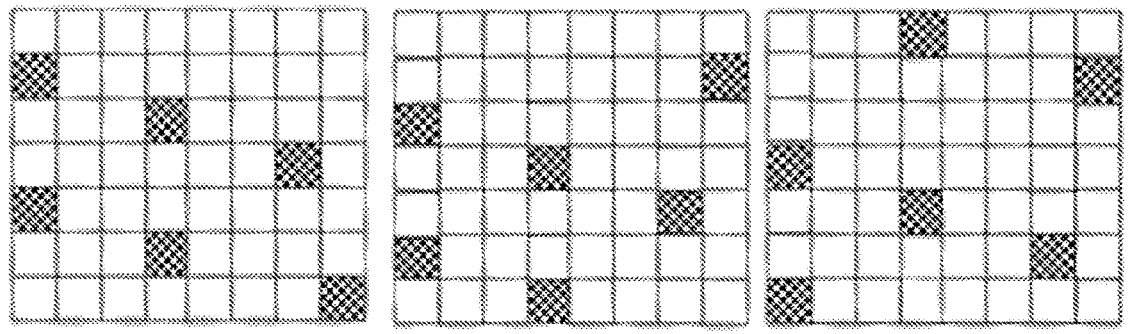
FIG. 2 is a schematic diagram of pilot configuration for a beam sequence according to an embodiment of the present disclosure.

The network device 1 is used as an example for description. FIG. 2 is a schematic diagram of a pilot sequence in the time domain and the frequency domain that is configured for a network device. As shown in FIG. 2, different sequence samples (that is, different time and frequency resources) are used for pilots of the beam sequence 1, the beam sequence 2, and the beam sequence 3 of the network device 1, avoiding a decrease in service quality caused by interference between the pilots of the network device 1 serving different over-the-air areas.

In addition, it should be noted that, with reference to the above introduction of an application scenario of the embodiments of the present disclosure, an entity for executing the above method may be a network management system, and in this case, the network device is a base station; or an entity for executing the above method may be a primary serving base station, and in this case, the network device is a secondary serving base station.

To make a person skilled in the art further understand the technical solution provided by this embodiment of the present disclosure, the following describes in detail the above steps.

Optionally, step S101 includes: receiving measurement information of beam sequences of network devices that is measured and sent by all terminal devices located in a first over-the-air area, where the measurement information includes received power of at least one of the following signals: a reference signal, a synchronization signal, and a channel state reference signal; and determining, according to the measurement information, the set of network devices that provides a network service for the first over-the-air area.

The first over-the-air area is any over-the-air area. All beam sequences of a network device are enabled when the network device is initially started. In this case, after detecting a signal of any beam sequence of any network device, a terminal device in any over-the-air area performs channel measurement, and feeds back the obtained measurement information to the network device, and the network device sends the measurement information to the network management system or the primary serving base station. In addition, when being initially started, the network device may further send information about identifiers of all the beam sequences to the network management system or the primary serving base station.

The received power of each of the reference signal, the synchronization signal, and the channel state reference signal reflects network coverage quality of the beam sequence with respect to the terminal device to some extent. Therefore, in a possible implementation of this embodiment of the present disclosure, a received power threshold of one or more of the reference signal, the synchronization signal, and the channel state reference signal may be preset. When measured received power of a network device is greater than the received power threshold, the network device is determined to belong to the set of network devices corresponding to the first over-the-air area.

Whether the network device belongs to the set of network devices corresponding to the first over-the-air area is determined according to the received power, which is only one example. During actual implementation, the following two manners may be specifically used to determine, according to the measurement information, the set of network devices that provides a network service for the first over-the-air area in this embodiment of the present disclosure.

In a first manner: a network device which a beam sequence with received power greater than the preset power threshold belongs to is determined, a set of candidate network devices is obtained, and a set of network devices that provides a network service for the first over-the-air area is determined from the set of candidate network devices based on a principle of seamless coverage, where the seamless coverage means that any position in the first over-the-air area has network coverage provided by a respective beam sequence.

In a case that network quality is ensured in the above manner, any position in the first over-the-air area has network coverage, ensuring that the terminal device can access a network at any position in the first over-the-air area.

In a second manner: a network device which a beam sequence with received power greater than the preset power threshold belongs to is determined, a set of candidate network devices is obtained, a coverage area of the network service for the first over-the-air area provided by each network device of the set of candidate network devices is determined, and if a coverage area of the network service provided by a first network device includes a coverage area of the network service provided by a second network device, the second network device is deleted from the set of candidate network devices, where the first network device and the second network device are any two different network devices of the set of candidate network devices.

A minimized set of network devices can be obtained in the above manners, so that an overhead of the network device can be reduced, and cell reselection and handover caused by network planning and terminal movement are reduced, thereby reducing management complexity.

It should be noted that, in an embodiment of the present disclosure, the first manner and the second manner above may also be combined to determine the set of network devices corresponding to each over-the-air area. For example, a network device which the beam sequence with the received power greater than the preset power threshold belongs to is determined and a first set of candidate network devices is obtained, a coverage area of the network service provided by each network device of the first set of candidate network devices is determined based on the second manner, and a second network device is deleted from the first set of candidate network devices to obtain a second set of network devices if a coverage area of the network service provided by a first network device of the first set of candidate network devices covers a coverage area of the network service provided by the second network device. Further, a set of network devices corresponding to each over-the-air area is determined from the second set of network devices based on the principle of seamless coverage. In other words, in a case that the seamless coverage is realized, the number of network devices providing the network service for the over-the-air area is minimized, and the overhead of the network device are reduced without affecting the network service.

Further, the method for configuring a resource in this embodiment of the present disclosure further includes: sending a beam disabling instruction to each network device of a set of network devices corresponding to the over-the-air area when no terminal device is detected to exist in any over-the-air area, where the beam disabling instruction is configured to disable a beam sequence of each network device providing a network service for the over-the-air area; or, sending a beam enabling instruction to each network device of a set of network devices corresponding to the over-the-air area when a terminal device is detected to exist in any over-the-air area, where the beam enabling instruction is configured to enable a beam sequence of each network device providing a network service for the over-the-air area.

For example, the base station has a plurality of beam sequences, and all the beam sequences of the base station are enabled when the base station is initially enabled. After the network management system obtains sufficient measurement results reported by a terminal, a set of network devices required for different over-the-air areas can be determined. In this case, when a terminal device such as an unmanned aerial vehicle exists in one over-the-air area, the network management system may configure a network device of a set of network devices that correspondingly serve the over-the-air area to enable a corresponding beam sequence. In addition, pilots are configured for the beam sequence to avoid interference according to the steps in the method shown in FIG. 1. When no terminal device exists in the over-the-air area, a beam sequence corresponding to a network device of a set of network devices corresponding to the over-the-air area may be disabled, to reduce power consumption.

In a possible implementation, the network management system or the primary serving base station may further send a correspondence between a beam sequence of a network device and an over-the-air area served by the beam sequence to the network device. In this way, when the network device determines that a terminal device exists in the corresponding over-the-air area, for example, when the network management system notifies the network device that a terminal device exists in the corresponding over-the-air area, the network device may enable, according to the correspondence, a beam sequence for serving the over-the-air area.

Figure 3:
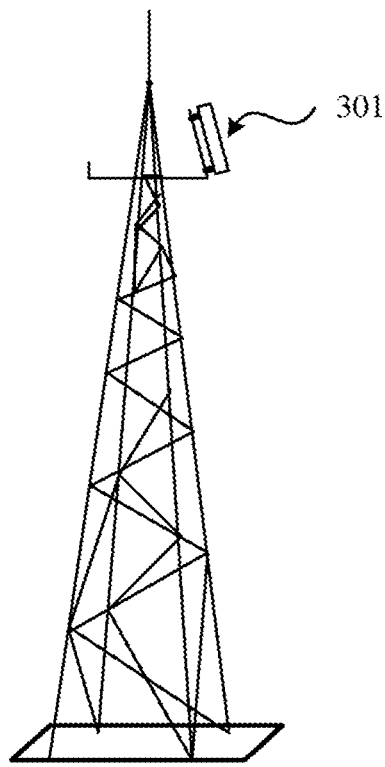
FIG. 3 is a schematic structural diagram of a network device according to an embodiment of the present disclosure.

In addition, it should be noted that the above method resolves a problem of mutual interference between signals of antenna beams providing a network service for different over-the-air areas on a same time and frequency resource, and may be applied to an existing base station. However, considering that an antenna of an existing base station has a down-tilt angle and serves the ground, instead of facing to the sky and serving an over-the-air area, an embodiment of the present disclosure further provides a network device 30. As shown in FIG. 3, the network device 30 includes a first antenna array 301 having an up-tilt angle. The first antenna array is configured to send a beam sequence for providing a network service for an over-the-air area. The network device 30 is a base station, for example, a primary serving base station or a secondary serving base station.

In this case, the network device 30 may be dedicated to serving the over-the-air area, thereby enhancing a network coverage capability for the over-the-air area.

Figure 4:
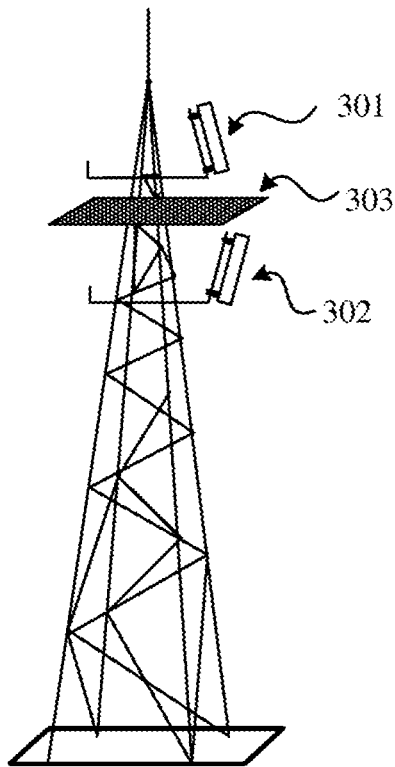
FIG. 4 is a schematic structural diagram of another network device according to an embodiment of the present disclosure.

In a possible implementation, as shown in FIG. 4, the network device 30 may further include a second antenna array 302 having a down-tilt angle, and a separator 303 disposed between the first antenna array and the second antenna array. The separator 303 is configured to isolate a beam sent by the first antenna array 301 from a beam sent by the second antenna array 302, to ensure no interference therebetween. That is, the network device 30 may serve both the ground and an over-the-air area, and signal interference between the ground service and the over-the-air service does not occur.

In this way, the network device described in the antiinterference method provided in the above method embodiment may be a network device 30 shown in FIG. 3 or FIG. 4, so that signal interference between the ground service and the over-the-air service and signal interference between over-the-air services don't occur.

Figure 5:
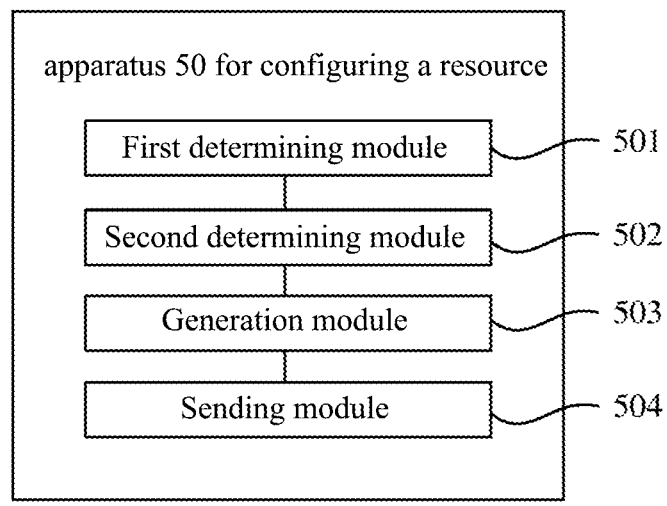
FIG. 5 is a schematic structural diagram of an apparatus for configuring a resource according to an embodiment of the present disclosure.

An embodiment of the present disclosure further provides an apparatus 50 for configuring a resource, which is configured to perform steps in the method for configuring a resource provided in the above method embodiment. As shown in FIG. 5, the apparatus 50 includes a first determining module 501, a second determining module 502, a generation module 503 and a sending module 504.

The first determining module 501 is configured to determine a set of network devices that corresponds to each over-the-air area and that provides a network service for the each over-the-air area, where the set of network devices includes an identifier of a network device satisfying a condition for providing a network service for the each over-the-air area.

The second determining module 502 is configured to determine, according to the set of network devices, a target network device providing a network service for a plurality of over-the-air areas, and a beam sequence used by the target network device.

The generation module 503 is configured to generate pilot configuration information for configuring a pilot sequence for the beam sequence of the target network device.

The sending module 504 is configured to send the pilot configuration information to the target network device.

Optionally, the pilot configuration information is designed by combining time domain and frequency domain, so that pilots of each beam sequence of the target network device are uniformly distributed in the time domain and the frequency domain, and pilots of a plurality of beam sequences providing a network service for different over-the-air areas are staggered in the time domain and the frequency domain, to avoid pilot interference between a plurality of beams providing a network service for the different over-the-air areas.

Optionally, the over-the-air area is an area represented by a height level or a height value range.

According to the above apparatus, the apparatus determines a network device providing a network service for a plurality of over-the-air areas, and configures pilots of a beam sequence of the network device. In this way, a respective pilot sequence can be configured for each of the plurality of beam sequences of the network device providing a network service for a respective over-the-air area, so that pilots of the beam sequences providing a network service for the different over-the-air areas are staggered in time and frequency domain, thereby avoiding pilot interference between beams, and improving network quality.

Optionally, the first determining module 501 includes a receiving submodule and a determining submodule.

The receiving submodule is configured to receive measurement information of beam sequences of network devices that is measured and sent by all terminal devices located in a first over-the-air area, where the measurement information includes received power of at least one of the following signals: a reference signal, a synchronization signal, and a channel state reference signal.

The determining submodule is configured to determine, according to the measurement information, the set of network devices that provides a network service for the first over-the-air area.

Optionally, the determining submodule is configured to determine a network device which a beam sequence with received power greater than the preset power threshold belongs to, and determine, from the set of candidate network devices based on a principle of seamless coverage, a set of network devices that provides a network service for the first over-the-air area, where the seamless coverage means that any position in the first over-the-air area has network coverage provided by a respective beam sequence.

Optionally, the determining submodule is configured to: determine a network device which a beam sequence with received power greater than the preset power threshold belongs to, obtain a set of candidate network devices, determine a coverage area of the network service for the first over-the-air area provided by each network device of the set of candidate network devices, and if a coverage area of the network service provided by a first network device includes a coverage area of the network service provided by a second network device, delete the second network device from the set of candidate network devices, where the first network device and the second network device are any two different network devices of the set of candidate network devices.

Optionally, the sending module 504 is further configured to: send a beam disabling instruction to each network device of a set of network devices corresponding to the over-the-air area when no terminal device is detected to exist in any over-the-air area, where the beam disabling instruction is configured to disable a beam sequence of each network device providing a network service for the over-the-air area; or send a beam enabling instruction to each network device of a set of network devices corresponding to the over-the-air area when a terminal device is detected to exist in any over-the-air area, where the beam enabling instruction is configured to enable a beam sequence of each network device providing a network service for the over-the-air area.

It should be noted that a person skilled in the art can clearly understand that, for the purpose of convenient and brief description, a detailed description of an operating process of the apparatus described above may refer to the corresponding process in the above method embodiment. Details are not described herein again.

Figure 6:
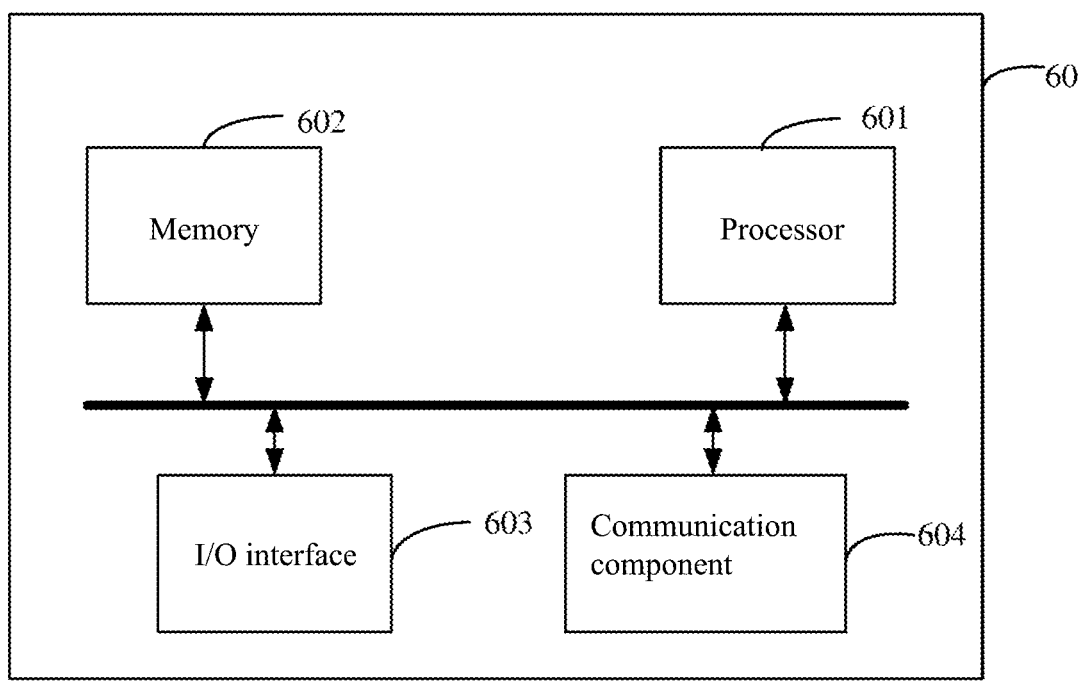
FIG. 6 is a schematic structural diagram of another apparatus for configuring a resource according to an embodiment of the present disclosure.

FIG. 6 is a schematic structural diagram of an apparatus 60 for configuring a resource according to an embodiment of the present disclosure. As shown in FIG. 6, the apparatus 60 may include: a processor 601, a memory 602, an input/output (I/O) interface 603, and a communication component 604.

The processor 601 is configured to control overall operation of the apparatus 60, to perform all or some of the steps in the above method for configuring a resource. The memory 602 is configured to store various types of data to support an operation on the apparatus 60. The data may include, for example, an instruction used to perform any application program or method operated on the apparatus 60.

The memory 602 may be implemented by any type of volatile or non-volatile storage device or a combination thereof, for example, a static random access memory (SRAM), an electrically erasable programmable read only memory (EEPROM), an erasable programmable read only memory (EPROM), a programmable read only memory (PROM), a read-only memory (ROM), a magnetic memory, a flash memory, a magnetic disk, or an optical disc.

The communication component 604 is configured to perform wired or wireless communication between the apparatus 60 and another device.

In a possible implementation, the apparatus 60 may be implemented by one or more application-specific integrated circuits (ASIC), a digital signal processor (DSP), a digital signal processing device (DSPD), a programmable logic device (PLD), a field programmable gate array (FPGA), a controller, a microcontroller, a microprocessor, or another electronic element, which is configured to perform the above method for configuring a resource.

An embodiment of the present disclosure further provides a non-transitory computer readable storage medium 1. The non-transitory computer readable storage medium 1 includes one or more programs which are configured to perform the method for configuring a resource. The method is applied to a network management system or a primary serving base station. The method includes: determining a set of network devices that corresponds to each over-the-air area and that provides a network service for the each over-the-air area, where each set of network devices includes an identifier of a network device satisfying a condition for providing a network service for the each over-the-air area; determining, according to the each set of network devices, a target network device providing a network service for a plurality of over-the-air areas, and a beam sequence used by the target network device; generating pilot configuration information used for configuring a pilot sequence for the beam sequence of the target network device; and sending the pilot configuration information to the target network device.

Optionally, the pilot configuration information is designed by combining time domain and frequency domain, so that pilots of each beam sequence of the target network device are uniformly distributed in the time domain and the frequency domain, and pilots of each of a plurality of beam sequences providing a network service for each of different over-the-air areas are staggered in the time domain and the frequency domain, to avoid pilot interference between a plurality of beams providing a network service for the different over-the-air areas.

Optionally, the determining a set of network devices that corresponds to each over-the-air area and that provides a network service for the each over-the-air area includes: receiving measurement information of beam sequences of network devices that is measured and sent by all terminal devices located in a first over-the-air area, where the measurement information includes received power of at least one of the following signals: a reference signal, a synchronization signal, and a channel state reference signal; and determining, according to the measurement information, the set of network devices that provides a network service for the first over-the-air area.

Optionally, the determining, according to the measurement information, the set of network devices that provides a network service for the first over-the-air area includes: determining a network device which a beam sequence with received power greater than a preset power threshold belongs to, and obtaining a set of candidate network devices; and determining, from the set of candidate network devices based on a principle of seamless coverage, a set of network devices that provides a network service for the first over-the-air area, where the seamless coverage means that any position in the first over-the-air area has network coverage provided by a respective beam sequence.

Optionally, the determining, according to the measurement information, the set of network devices that provides a network service for the first over-the-air area includes: determining a network device which a beam sequence with received power greater than a preset power threshold belongs to, and obtaining a set of candidate network devices; determining a coverage area of the network service for the first over-the-air area provided by each network device of the set of candidate network devices; and if a coverage area of the network service provided by a first network device includes a coverage area of the network service provided by a second network device, deleting the second network device from the set of candidate network devices, where the first network device and the second network device are any two different network devices of the set of candidate network devices.

Optionally, the method further includes: sending a beam disabling instruction to each network device of a set of network devices corresponding to the over-the-air area when no terminal device is detected to exist in any over-the-air area, where the beam disabling instruction is configured to disable a beam sequence of each network device providing a network service for the over-the-air area; or sending a beam enabling instruction to each network device of a set of network devices corresponding to the over-the-air area when a terminal device is detected to exist in any over-the-air area, where the beam enabling instruction is configured to enable a beam sequence of each network device providing a network service for the over-the-air area.

Optionally, the over-the-air area is an area represented by a height level or a height value range.

An embodiment of the present disclosure further provides an apparatus 2 for configuring a resource. The apparatus 2 for configuring a resource includes: the non-transitory computer readable storage medium 1, and one or more processors for executing the program in the non-transitory computer readable storage medium 1.

An embodiment of the present disclosure further provides a network device 3. The network device 3 includes the apparatus 50 for configuring a resource shown in FIG. 5, or the network device 3 includes the apparatus 60 for configuring a resource shown in FIG. 6, or the network device 3 includes the apparatus 2 for configuring a resource. The network device 3 may be a network management system or a primary serving base station.

Although preferable embodiments of the present disclosure have been described in detail above with reference to the accompanying drawings, the present disclosure is not limited to specific details in the above embodiments. Various simple variations can be made to the technical solutions of the present disclosure within the scope of the technical idea of the present disclosure, and such simple variations all fall within the protection scope of the present disclosure.

It should be further noted that the specific technical features described in the above specific embodiments can be combined in any appropriate manner without contradictions. To avoid unnecessary repetition, various possible combination manners will not be described in the present disclosure.

In addition, various embodiments of the present disclosure may be combined arbitrarily without deviating from the idea of the present disclosure, and the combined embodiments should be considered as the content disclosed in the present disclosure.

The foregoing descriptions are only specific embodiments of the present disclosure, but the protection scope of the present disclosure is not limited thereto. Any variation or replacement readily figured out by a person skilled in the art within the technical scope of the present disclosure shall fall within the protection scope of the present disclosure. Therefore, the protection scope of the present disclosure shall be subject to the protection scope of the claims.

What is claimed is:

1. A method for configuring a resource, comprising:
   obtaining a plurality of over-the-air areas, wherein, each over-the-air area of the plurality of over-the-air area is an area defined by a height level or a height value range;
   determining a set of network devices that corresponds to each over-the-air area and that provides a network service for each over-the-air area, wherein, each set of network devices comprises an identifier of a network device satisfying a condition for providing a network service for the each over-the-air area;
   determining a target network device providing a network service for a plurality of over-the-air areas according to a plurality of sets of network devices determined for the plurality of over-the-air areas, and determining a beam sequence used by the target network device;
   generating pilot configuration information for configuring a pilot sequence for the beam sequence of the target network device; and
   sending the pilot configuration information to the target network device,
   wherein the determining a set of network devices that corresponds to each over-the-air area and that provides a network service for the each over-the-air area comprises:
   receiving measurement information of beam sequences of network devices that is measured and sent by all terminal devices located in a first over-the-air area, wherein the measurement information comprises received power of at least one of the following signals: a reference signal, a synchronization signal, and a channel state reference signal; and
   determining, according to the measurement information, the set of network devices that provides a network service for the first over-the-air area;
   wherein the determining, according to the measurement information, the set of network devices that provides a network service for the first over-the-air area comprises:

determining a network device which a beam sequence with received power greater than a preset power threshold belongs to, and obtaining a first set of candidate network devices;

determining a coverage area of the network service for the first over-the-air area provided by each network device of the first set of candidate network devices; and if a coverage area of the network service provided by a first network device includes a coverage area of the network service provided by a second network device, deleting the second network device from the first set of candidate network devices, wherein the first network device and the second network device are any two different network devices of the first set of candidate network devices.

2. The method according to claim 1, wherein the pilot configuration information is designed by combining time domain and frequency domain, so that pilots of each beam sequence of the target network device are uniformly distributed in the time domain and the frequency domain, and pilots of each of a plurality of beam sequences providing a network service for each of different over-the-air areas are staggered in the time domain and the frequency domain, to avoid pilot interference between a plurality of beams providing a network service for the different over-the-air areas.

3. The method according to claim 2, wherein the method further comprises:

sending a beam disabling instruction to each network device of a set of network devices corresponding to the over-the-air area when no terminal device is detected to exist in any over-the-air area, wherein the beam disabling instruction is configured to disable a beam sequence of each network device providing a network service for the over-the-air area; or sending a beam enabling instruction to each network device of a set of network devices corresponding to the over-the-air area when a terminal device is detected to exist in any over-the-air area, wherein the beam enabling instruction is configured to enable a beam sequence of each network device providing a network service for the over-the-air area.

4. The method according to claim 1, wherein the determining, according to the measurement information, the set of network devices that provides a network service for the first over-the-air area further comprises:

determining, based on a principle of seamless coverage, from a second set of candidate network devices obtained after deleting the second network device from the first set of candidate network devices, the set of network devices that provides a network service for the first over-the-air area, wherein the seamless coverage means that any position in the first over-the-air area has network coverage provided by a respective beam sequence.

5. The method according to claim 4, wherein the method further comprises:

sending a beam disabling instruction to each network device of a set of network devices corresponding to the over-the-air area when no terminal device is detected to exist in any over-the-air area, wherein the beam disabling instruction is configured to disable a beam sequence of each network device providing a network service for the over-the-air area; or sending a beam enabling instruction to each network device of a set of network devices corresponding to the over-the-air area when a terminal device is detected to exist in any over-the-air area, wherein the beam enabling instruction is configured to enable a beam sequence of each network device providing a network service for the over-the-air area.

6. The method according to claim 1, wherein the method further comprises:

sending a beam disabling instruction to each network device of a set of network devices corresponding to the over-the-air area when no terminal device is detected to exist in any over-the-air area, wherein the beam disabling instruction is configured to disable a beam sequence of each network device providing a network service for the over-the-air area; or sending a beam enabling instruction to each network device of a set of network devices corresponding to the over-the-air area when a terminal device is detected to exist in any over-the-air area, wherein the beam enabling instruction is configured to enable a beam sequence of each network device providing a network service for the over-the-air area.

7. A non-transitory computer readable storage medium, wherein the non-transitory computer readable storage medium comprises one or more programs for executing the method according to claim 1.

8. An apparatus for configuring a resource, comprising: the non-transitory computer readable storage medium according to claim 7, and one or more processors for executing the program in the non-transitory computer readable storage medium.

9. The apparatus for configuring a resource according to claim 8, wherein the pilot configuration information is designed by combining time domain and frequency domain, so that pilots of each beam sequence of the target network device are uniformly distributed in the time domain and the frequency domain, and pilots of each of a plurality of beam sequences providing a network service for each of different over-the-air areas are staggered in the time domain and the frequency domain, to avoid pilot interference between a plurality of beams providing a network service for the different over-the-air areas.

10. The apparatus for configuring a resource according to claim 8, wherein the determining, according to the measurement information, the set of network devices that provides a network service for the first over-the-air area comprises:

determining, based on a principle of seamless coverage, from a second set of candidate network devices obtained after deleting the second network device from the first set of candidate network devices, the set of network devices that provides a network service for the first over-the-air area, wherein the seamless coverage means that any position in the first over-the-air area has network coverage provided by a respective beam sequence.

11. The apparatus for configuring a resource according to claim 8, wherein the method further comprises:

sending a beam disabling instruction to each network device of a set of network devices corresponding to the over-the-air area when no terminal device is detected to exist in any over-the-air area, wherein the beam disabling instruction is configured to disable a beam sequence of each network device providing a network service for the over-the-air area; or sending a beam enabling instruction to each network device of a set of network devices corresponding to the over-the-air area when a terminal device is detected to exist in any over-the-air area, wherein the beam enabling instruction is configured to enable a beam sequence of each network device providing a network service for the over-the-air area.

12. A network device, comprising the apparatus for configuring a resource according to claim 8, wherein the network device is a network management system device or a primary serving base station.

* * * * *